United States Patent [19]

Kato

[11] Patent Number: 4,672,903

[45] Date of Patent: Jun. 16, 1987

[54] PATTERN INPUT DEVICE OF A SEWING MACHINE

[75] Inventor: Kenji Kato, Tokyo, Japan

[73] Assignee: Janome Sewing Machine Co., Ltd.?, Tokyo, Japan

[21] Appl. No.: 753,671

[22] Filed: Jul. 10, 1985

[30] Foreign Application Priority Data

Jul. 10, 1984 [JP] Japan .................... 59-141346

[51] Int. Cl.⁴ .............................................. D05B 3/02
[52] U.S. Cl. ................................. 112/457; 112/121.12
[58] Field of Search ................. 112/457, 453, 121.12, 112/121.11; 318/568; 364/400, 470, 191

[56] References Cited

U.S. PATENT DOCUMENTS

| | | | |
|---|---|---|---|
| 4,074,642 | 2/1978 | Herr | 112/457 |
| 4,154,178 | 5/1979 | Brown et al. | 112/457 |
| 4,429,364 | 1/1984 | Maruyama et al. | 112/457 X |
| 4,446,520 | 5/1984 | Shigeta ert al. | 112/121.12 X |

Primary Examiner—Peter Nerbun
Attorney, Agent, or Firm—Michael J. Striker

[57] ABSTRACT

In a sewing machine which has a conventional needle amplitude adjusting device and a conventional fabric feed adjusting device are used as a detector for receiving an input of an information of a stitch coordinate, and an connector member is provided which is adapted to move said devices vertically and laterally. The operating member is attached to the sewing machine. When the operating connector member is moved and this movement is designated to be stored, a value of each of vertically and laterally crossing components of said member is detected, respectively, in said devices, and each of said values is stored in a random-access-memory. If the operating connector member traces a desired pattern sample and the memory designation is operated, the data of a continuously stitching coordinate of said desired pattern are stored.

6 Claims, 7 Drawing Figures

FIG_1
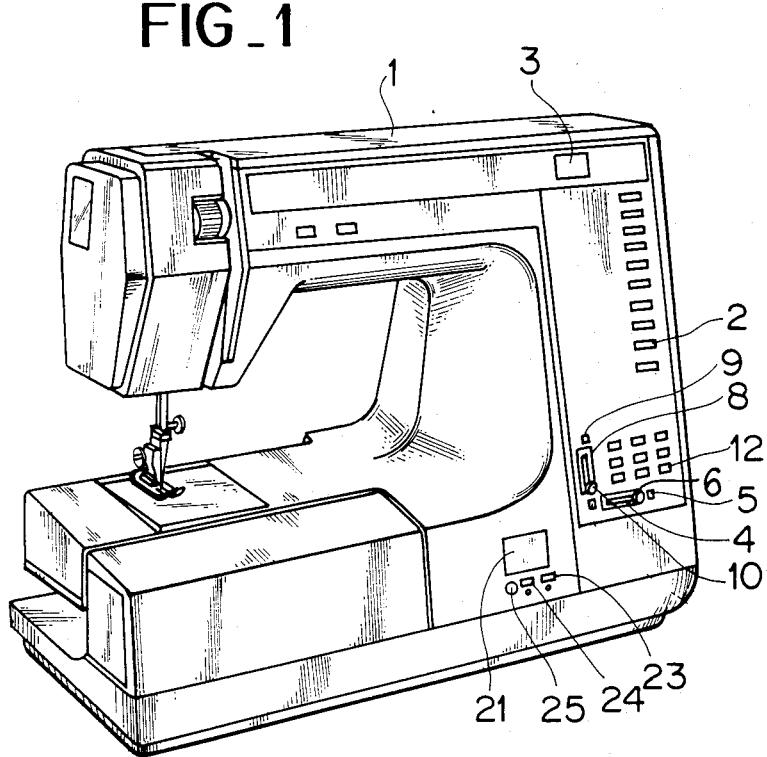
FIG_6
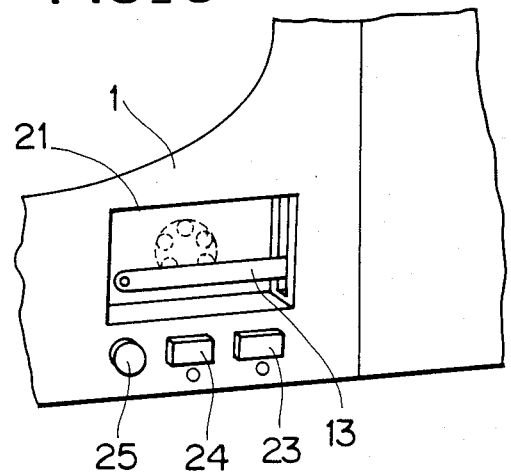

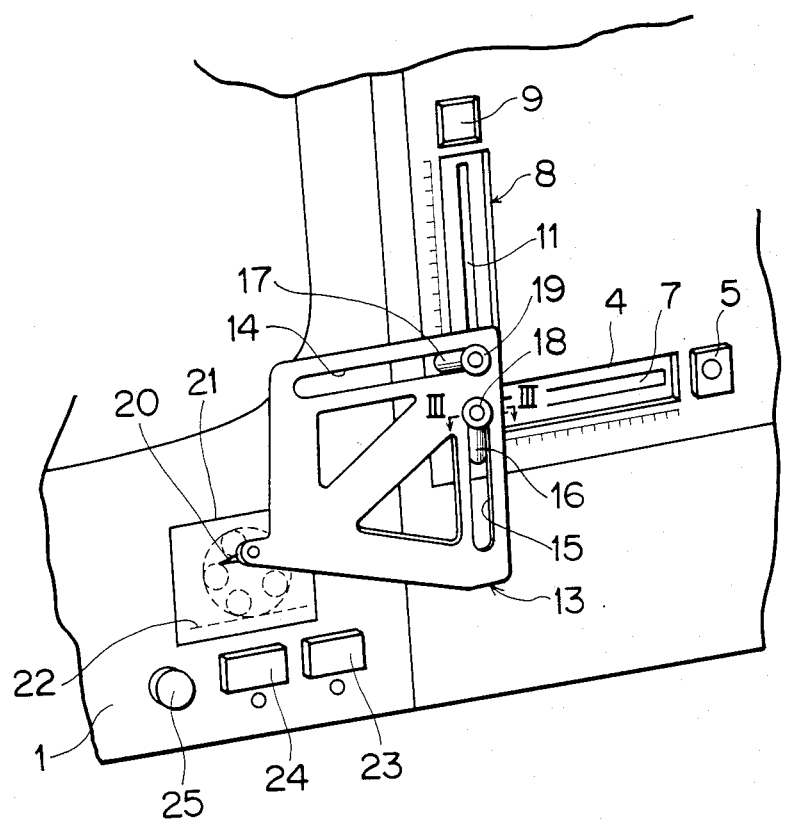
FIG_2
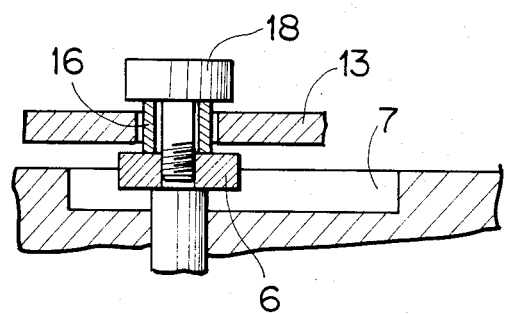
FIG_3

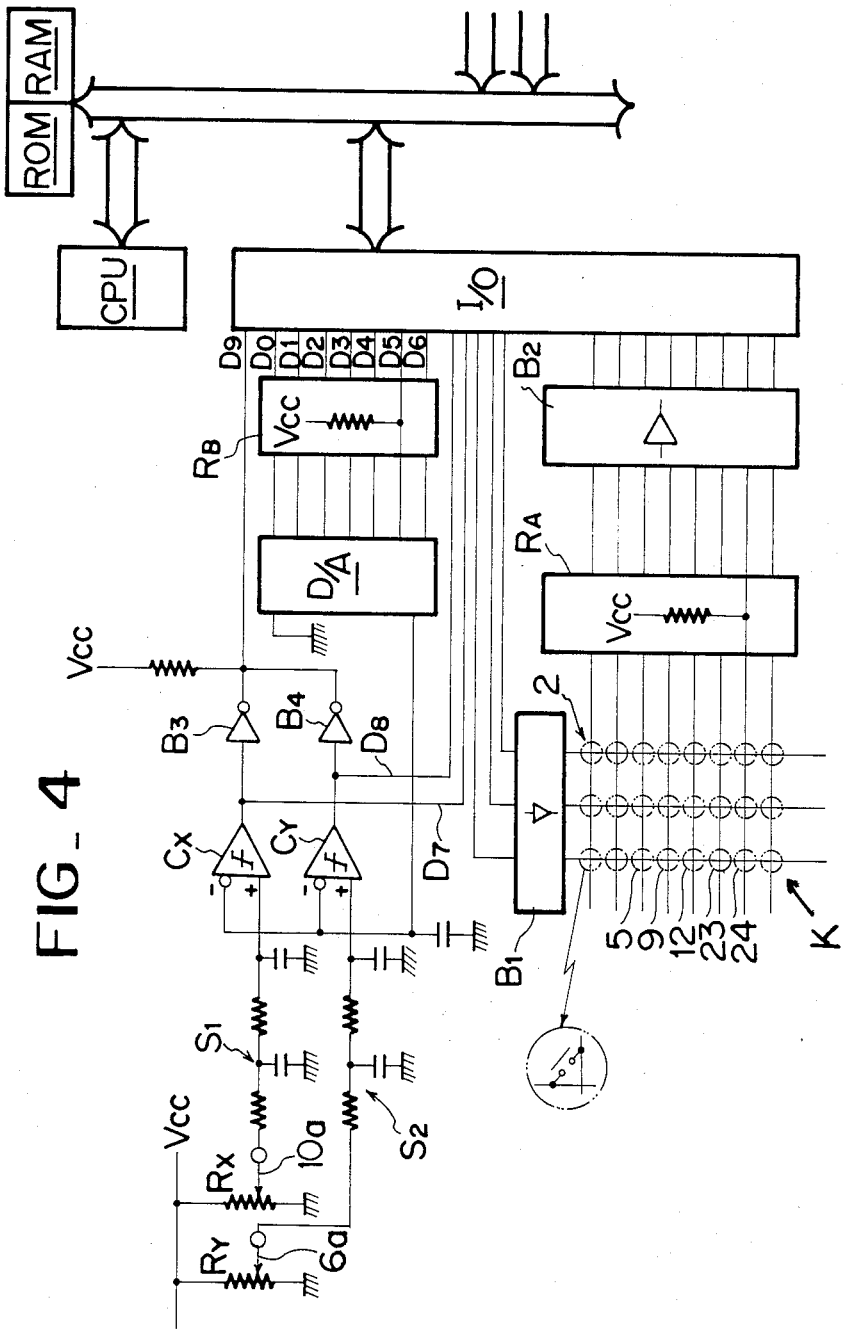
FIG_4

FIG_5(A)

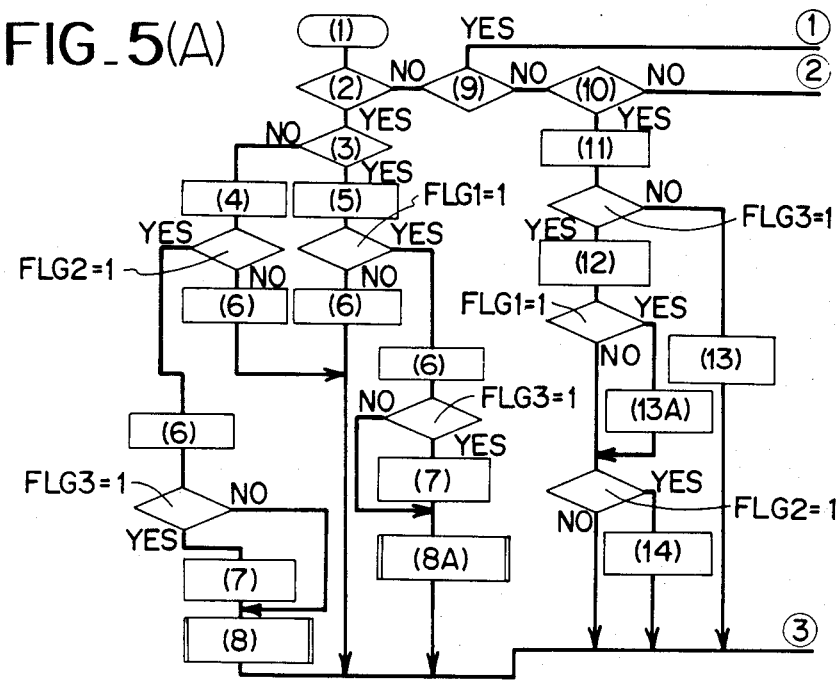

(1) Key scanning
(2) Adjustment designating key
(3) Needle amplitude
(4) FLG2 Inversion
(5) FLG1 Inversion
(6) Response LED OFF
(7) FLG3 Inversion, Response LED OFF
(8) Manual feed amount, Setting of reduction rate of pattern
(8A) Setting of reduction rate of pattern for manual needle amplitude
(9) During driving   (10) Mode switching key
(11) FLG3 Inversion
(12) Indication of pattern number of external input
(13) Clearing of indication of pattern number of external input
(13A) FLG1 Inversion, Response LED OFF
(14) FLG2 Inversion, Response LED OFF

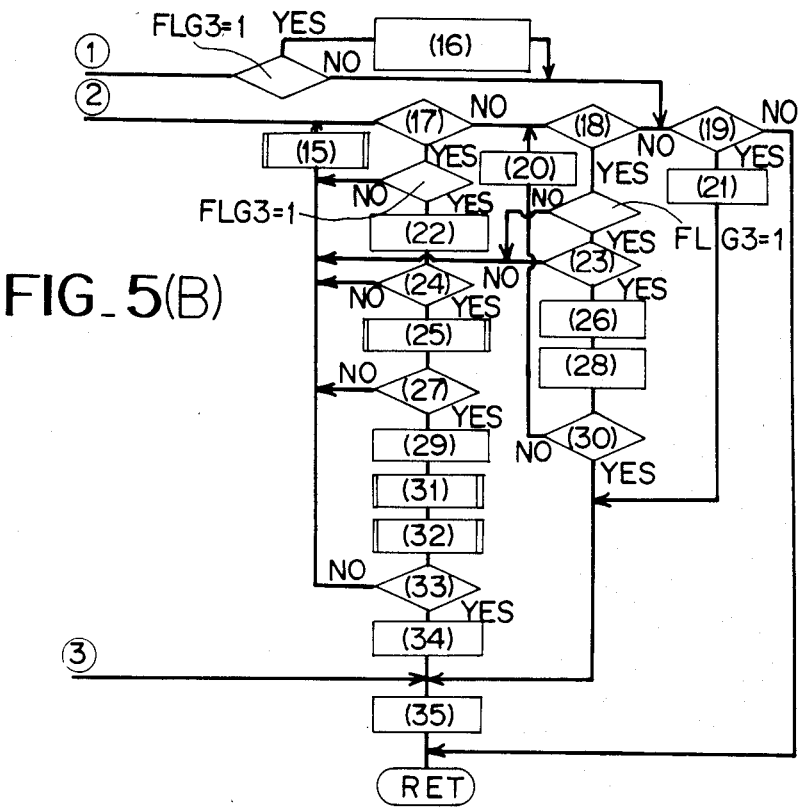

FIG_5(B)

- (15) Indication of each of errors
- (16) FLG3 Inversion, Clear indication of pattern number of external input
- (17) Memory designating key
- (18) Finish key
- (19) Other keys
- (20) Finish indication
- (21) Other treatments
- (22) Setting of memory address of pattern coordinate of external input
- (23, 24) Range of setting memory
- (25) Read-in of needle amplitude coordinate
- (26) Memory of finished code
- (27) Range of setting amplitude
- (28) Pattern number+1 of external input
- (29) Memory of needle amplitude coordinate
- (30) Range of setting number
- (31) Read-in of feed coordinate
- (32) Preceding value − present value
- (33) Range of setting feed amount
- (34) Memory of feed amount
- (35) Voice of key operation

PATTERN INPUT DEVICE OF A SEWING MACHINE

BACKGROUND OF THE INVENTION

The present invention relates to a sewing machine which electronically controlled to form stitched patterns, and especially enables register of informations of desired patterns to be stitched.

In a conventional sewing machine which may register informations of patterns to be stitched, a machine operator draws a desired pattern in a program sheet, makes data of vertical and lateral numerical values, and inputs the vertical and lateral data per each of stitches following a stitching order. For example, for inputting one vertical and lateral couple of numbers of two figures as data of one stitching, a key must be operated four times.

Another proposal is that a pattern information input device has an exclusive detector which is independently provided on or externally of the sewing machine, and the coordinate data are input while a desired pattern is traced. However, such a device is expensive and has a problem of a positioning space.

SUMMARY OF THE INVENTION

The present invention has been devised to avoid the above mentioned problem. In a device according to the invention a conventional needle amplitude adjusting device and a fabric feed adjusting device are connected to a detector for inputting informations of a stitch coordinate, and an operating member, which is in common to move these devices vertically and laterally is attached to the sewing machine. When said operating member is moved and this movement is designated to be stored, a value of each of vertically and laterally crossing components of said member is detected, respectively, in said devices, and each of said values is stored in a random-access-memory. Thus, if the operating member follows a desired pattern sample and the memory designation is operated, the data of a continuously stitching coordinate of said desired pattern are stored.

BRIEF DESCRIPTION OF THE DRAWINGS

FIG. 1 is a front perspective view of a sewing machine, which is provided with a device of this invention;

FIG. 2 shows an attachment of an operating member of the device of the invention;

FIG. 3 is a cross sectional view along line III—III of FIG. 2;

FIG. 4 is a control circuit diagram of an external pattern input;

FIGS. 5A and 5B show a flow chart of the control of the external pattern input of FIG. 4; and FIG. 6 is an operating member and an attachment thereof in another embodiment.

THE DETAILED DESCRIPTION OF THE PREFERRED EMBODIMENT OF THE INVENTION

An explanation will be made to an embodiment of the invention in reference to the attached drawings.

In FIGS. 1 to 3, pattern selecting switches 2 serve as tenkeys, and select stitchings of various patterns, including external input patterns. An indicator 3 shows selections by lumination.

A needle amplitude adjusting device 4 displays a function as a 1st purpose when a manual adjustment designating key 5 is operated. When a thumb 6 is laterally moved along an oblong hole 7, a needle amplitude amount of the selected pattern is adjusted in proportion to stitchings.

A fabric feed adjusting device 8 displays a function as a 1st purpose when a manual adjustment designating key 9 is operated. A thumb 10 moves in cross with the thumb 6, and when it is vertically moved along an oblong hole 11, a fabric feed amount is adjusted.

A mode switching key 12 is operated at time when an external input is designated. Then, the amplitude adjusting device 4 and the feed adjusting device 8 serve as an external input devices of 2nd purposes.

An operating member 13 is to move the thumbs 6,10 for receiving an input of coordinate data of the external input patterns, and is defined with oblong holes 14,15 extending transversely of each other. The thumbs 6,10 are threaded, and the operating member 13 is attached to the front face of the sewing machine by inserting engaging members 16,17 in the oblong holes 14,15 and mounting headed screws 18,19. In said attaching state, the operating member 13 is smoothly set between the thumb 6 or 10 and the screw 18 or 19, and the engaging member 16 or 17 makes a face-contact with the ablong hole 14 or 15 without space, so that the operating member 13 is moved laterally or vertically within the range of the holes 14,15 and these holes 14,15 are not tilted.

The operating member 13 has an indicating element 20 at its one end, and a machine body 1 has a sample pattern housing frame 21 at a element within movement of the indicating part 20. When the mode switching key 12 designates the external input, the stitching order of the pattern 22 is assumed and the indicating element 20 traces said pattern and the thumbs 6,10 are moved thereby, and the informations of mutual crossing positions are input.

A memory designating key 23 designates position coordinate data of the indicating part 20 per each of the operations to a random-access-memory to store said data.

In the present embodiment, since the pattern 22 is successively formed from the left to the right of the drawing plane with respect to the normal feed, the amplitude adjusting device 4 constitutes data input of a fabric feed directional component when the external input is designated, and the feed adjusting device 8 constitutes data input of a needle amplitude directional component.

A finish key 24 designates finishing of the pattern input.

An error indicator 25 indicates an error, when a moving amount of the indicator 20 per each operation of the memory designating key 23 exceeds the maximum fabric feed amount or when the stored stitches exceed the storing capacity.

FIG. 4 is a control circuit diagram for the external pattern input memory and a microcomputer. The latter includes a central processing unit (CPU), a read-only-memory (ROM), a random-access-memory (RAM) and an input-output port (I/O).

ROM also stores control signals of ordinary stitching patterns, and RAM stores the coordinate data moving and designating the operating member 13.

A key-matrix (K) is composed of the ten-key 2, the adjustment designating keys 5,9, the mode switching key 12, the memory designating key 23 and the finish key 24. When these members are operated, the microcomputer carries out reading.

(B1),(B2) are buffers, (RA) is a pull-up resistor, and (Vcc) is an electric power source of positive potential.

A variable resistor (Rx) is operable to issue a voltage at such a level in response to a moving position of a wiper 10a which moves in response to the movement of the thumb 10. In the circuit of FIG. 4 for the external pattern input, the level of the voltage responds as the data of the needle amplitude directional component in the coordinate of the moving positions of the indicator 20.

A variable resistor (Ry) is adapted to issue a voltage at such a level in response to a moving position of a wiper 6a which moves in response to movement of the thumb 6, and the voltage level thereof responds as the data of the fabric feed directional component.

Comparators (Cx),(Cy) receive signals at voltage levels of the wipers 10a,6a at non-inversion terminals (+) thereof via smoothing circuits (S1), (S2).

Digital-analog converter (D/A) composes a ladder-type circuit. When it receives digital data of 7 bits successively treated by a program for confirming comparison (not shown), via lines (D6)-(D0) and a pull-up resistor (RB), it converts said digital data into weights of 64, 32, 16, 8, 4, 2, 1, and obtains their adding value of 0–127, and gives these data to the comparators (Cx),(Cy) at the convert input terminals (−). However, since the data 1 1 1 1 1 1 1 of the lines (D6) to (D0) are used as the finish (END) signals, the values of 0 to 126 are used as the comparing data.

The comparators (Cx),(Cy) compare the input signals of the input terminals (+)(−), and issue signals of H-level or L-level in accordance with discrimination of said comparisons.

The lines (D7) or (D8) make operative the outputs of the comparators (Cx) or (Cy) when said lines are H-level, and nullify the outputs when they are L-level. CPU selectively makes one of said output H-level and the other L-level, and the lines (D7) or (D8) receive the output signal of the comparator (Cx) or (Cy) in response to said H-level via a line (D9).

The buffers (B3)(B4) invert the output signal of the comparator (Cx) or (Cy), and transfer it.

Main operations of the above mentioned structure will be now explained. The operating member 13 and the sample pattern 22 are provided in the sewing machine as seen in FIG. 2.

Referring to FIGS. 5A and 5B, flags (FLG1)(FLAG2)(FLAG3) are reset at 0 when supplying the control power source. FLAG1=1 shows that the value of the needle amplitude is a manual mode, FLG2=1 shows that the value of the fabric feed is a manual mode, and FLG3=1 shows that the external pattern input is a manual mode.

When the program is started, the key (K) is scanned, and when the mode switching key 12 is operated while the sewing machine is at rest, FLG3 is made 1 and given a number of a pattern which is to be input externally, and this number is shown at the indicator 3. FLAG1 and FLAG2 are made 0, and a sound of the confirmation signal is issued and the program is returned to the initial position (RET).

The operating member 13 is operated, and when the memory designating key 23 is operated after the designating part 20 is met with a stitch starting position of the pattern 22, an address is set for storing the coordinate of the external input pattern to RAM, and the data of the needle amplitude component of the stitching coordinate at this time are read out. That is, the line (D7) is made H-level, and the lines (D0) to (D6) successively issue the data for confirming the comparison to the needle amplitude directional component of the pattern coordinate, and when the inputs (+)(−) of the comparator (Cx) coincide with each other, said data for confirming the comparison are read out, treated and stored as the needle amplitude data.

Similarly, the line (D8) is made H-level, and the comparison confirming data to the fabric feed directional component are issued from the lines (D0) to (D8) and read out, and data without feed of an initial value is stored as fabric feed data at this time.

This continuous operation is finished in a short time, and the program is returned to the initial position.

The operating member 13 is operated to meet the indicator 20 in the 2nd stitching position, and if the memory designating key 23 is operated, the corresponding needle amplitude data and fabric feed data are stored at an address position next to RAM.

For the fabric feed data, the difference between the preceding and the present data of the fabric feed directional components is used, and thus the stitching data are stored each time when the memory is designated.

The error indicator 25 is indicated when the stitching number for one pattern exceeds a predetermined number or when the needle amplitude amount or the fabric feed amount exceeds a determined value.

When the input operation for the pattern 22 is finished and the finish key 24 is operated, the finish code 1 1 1 1 1 1 1 are stored in RAM, and the number of the external input pattern is added +1 and it is shown at the indicator 3 for storing a subsequent external input pattern.

The finish code is used for repeating the patterns during performing the stitchings. For stitching, the pattern number is designated by the ten key 2 in the same manner as the ordinary pattern selection.

FIG. 6 is another embodiment in which, an operating member 13 of FIG. 2 may be substituted for the operating member 13.

Due to the present invention, the conventional stitch adjusting device may be used for detecting the coordinate of the external input pattern, so that the device is inexpensive, and a space therefor may be small. The operation for the external input is easy and exact, since the switch operation is performed while the operating member traces on the desired pattern, so that each of the data of the needle amplitude coordinate and the fabric feed coordinate is stored.

What is claimed is:

1. In a sewing machine comprising a first memory storing a plurality of different patterns each in a form of stitch control data including data for controlling a needle position and a fabric feed amount, the stitch control data being selectively read out to produce a selected pattern, a second memory for temporarily storing the patterns selected out from the first memory, needle position adjusting means manually operated to optionally adjust a needle position, and feed amount adjusting means manually operated to adjust a feed amount for at least one selected pattern, the improvement comprising:

(a) switching means including an operating key (12) operated to make said needle position adjusting means and said feed amount adjusting means responsive to external information;

(b) connector means including a connector member (13) for operatively connecting said needle position adjusting means and said feed amount adjusting means to each other, said connector member having an indicating element (20) and being manually operated to move said indicating element so as to trade a desired pattern while said needle position adjusting means and said feed amount adjusting means are moved in association with said connector member together with each other or independently from each other; (c) signal generating means ($R_Y$, $R_X$, $6_a$, $10_a$) activated in association with said needle position adjusting means and said feed amount adjusting means to produce a signal each time said indicating element changes a position thereof; and (d) memorizing means including a memorizing key (23) operated each time indicating element changes a position thereof to memorize the signal produced by said signal generating means into said second memory.

2. The sewing machine as defined in claim 1, wherein said needle position adjusting means includes a first knob (6) linearly operated to activate said needle position adjusting means, and said feed amount adjusting means includes a second knob (10) linearly operated to activate said feed amount adjusting means, and wherein said connector member is formed with a first linear groove (15) engaging said first knob and a second linear groove (14) engaging said second knob.

3. The sewing machine as defined in claim 1, further comprising a frame (21) carrying a pattern detachably mounted to said frame to be traced by said indicating element.

4. The sewing machine as defined in claim 1, wherein said signal generating means includes a first variable resistor ($R_Y$) and a first wiper ($6_a$) operatively connected to said needle position adjusting means and a second variable resistor ($R_X$) and a second wiper ($10_a$) operatively connected to said feed amount adjusting means.

5. The sewing machine as defined in claim 1, further comprising end designating means including an end designating key (24) operated to designate termination of storing the signals into said second memory from said signal generating means.

6. The sewing machine as defined in claim 1, further comprising warning means including a lamp activated in response to an overrun-movement of said indicating element to indicate an erroneous operation thereof.

* * * * *